(12) United States Patent
Sartorius

(10) Patent No.: US 11,358,705 B2
(45) Date of Patent: Jun. 14, 2022

(54) NOSE CONE

(71) Applicant: Skydio, Inc., Redwood, CA (US)

(72) Inventor: Thomas Skyler Sartorius, San Francisco, CA (US)

(73) Assignee: Skydio, Inc., Redwood City, CA (US)

( * ) Notice: Subject to any disclaimer, the term of this patent is extended or adjusted under 35 U.S.C. 154(b) by 136 days.

(21) Appl. No.: 15/693,191

(22) Filed: Aug. 31, 2017

(65) Prior Publication Data

US 2018/0057145 A1 Mar. 1, 2018

Related U.S. Application Data

(60) Provisional application No. 62/382,698, filed on Sep. 1, 2016.

(51) Int. Cl.
| | |
|---|---|
| *B64C 11/14* | (2006.01) |
| *B64C 11/04* | (2006.01) |
| *B64C 11/28* | (2006.01) |
| *B64C 39/02* | (2006.01) |
| *A63H 27/00* | (2006.01) |
| *B64D 27/26* | (2006.01) |
| *B64F 5/40* | (2017.01) |

(52) U.S. Cl.
CPC ............ *B64C 11/14* (2013.01); *A63H 27/001* (2013.01); *B64C 11/04* (2013.01); *B64C 11/28* (2013.01); *B64C 39/024* (2013.01); *B64C 2201/165* (2013.01); *B64C 2203/00* (2013.01); *B64D 27/26* (2013.01); *B64F 5/40* (2017.01)

(58) Field of Classification Search
CPC ....... B64C 11/14; B64C 39/024; B64C 11/28; B64C 11/04; B64C 2203/00; B64C 2201/165; B64C 2201/108; B64C 11/02; B64C 11/08; B64C 29/0025; B64C 1/0683; B64C 2201/042; A63H 27/001; B64F 5/40; B64D 27/26
USPC ........................................................ 416/245
See application file for complete search history.

(56) References Cited

U.S. PATENT DOCUMENTS

| | | | | |
|---|---|---|---|---|
| 8,430,709 | B1 * | 4/2013 | Wong ..................... | A63H 27/12 446/34 |
| 2004/0248496 | A1 * | 12/2004 | Harvey ................... | A63H 27/02 446/61 |
| 2006/0011777 | A1 * | 1/2006 | Arlton ..................... | B64C 39/024 244/7 B |
| 2014/0299708 | A1 * | 10/2014 | Green ..................... | B64D 27/24 244/17.23 |

* cited by examiner

*Primary Examiner* — Scott A Reinbold
(74) *Attorney, Agent, or Firm* — Young Basile Hanlon & MacFarlane, P.C.

(57) ABSTRACT

Disclosed here are systems for detachable airframe components including detachable nose cones, propeller assemblies and motors. In some example embodiments, the assemblies include a nose cone with a connection receiver, a motor assembly with a rotatable section, where the rotatable section includes torque arms configured to secure with the nose cone connection receiver, and a propeller assembly, configured to connect to the nose cone.

20 Claims, 5 Drawing Sheets

NOSE CONE

CLAIM OF BENEFIT TO PRIOR APPLICATIONS

This application claims priority to U.S. Provisional Patent Application Ser. No. 62/382,698, filed Sep. 1, 2016, the contents of which is incorporated by reference herein in its entirety.

TECHNICAL FIELD

This application relates to the field of aviation and flying machines. The application relates to airframe component parts, specifically nose cones, propellers and motors, and assembly and disassembly of them.

BACKGROUND

Previously, attaching and detaching parts of aircraft, including fixed wing and rotary aircraft such as drones and models required a myriad of connectors, tools, attachments and loose parts. This included attaching and detaching nose cone assemblies, propellers and motors. Such loose connector parts have the potential of getting lost, coming off in flight and adding cost.

It would be useful to have component parts that could more easily be attached and detached when performance or damage required, without loose connectors and parts.

SUMMARY

Disclosed here are systems for detachable airframe components including detachable nose cones, propeller assemblies and motors. In some example embodiments, the assemblies include a nose cone with a connection receiver, a motor assembly with a rotatable section, where the rotatable section includes torque arms configured to secure with the nose cone connection receiver, and a propeller assembly, configured to connect to the nose cone.

Some example embodiments have the motor assembly detachably coupled to an airframe. In some examples, the nose cone connection receiver includes at least two openings in the nose cone, each with a snap ledge and the torque arms each include a snap flange, where the torque arm snap flanges configured to mate with the snap ledges of the nose cone openings.

In some example embodiments, the propeller assembly includes a propeller connector bar with flange pairs at both ends of the propeller connector bar, the flange pairs configured to connect to a hinged propeller. In some examples, the torque arms are deflectably resilient toward each other to allow the nose cone to snap on and off the torque arms of the motor assembly.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the figures.

DETAILED DESCRIPTION

Figure 1:
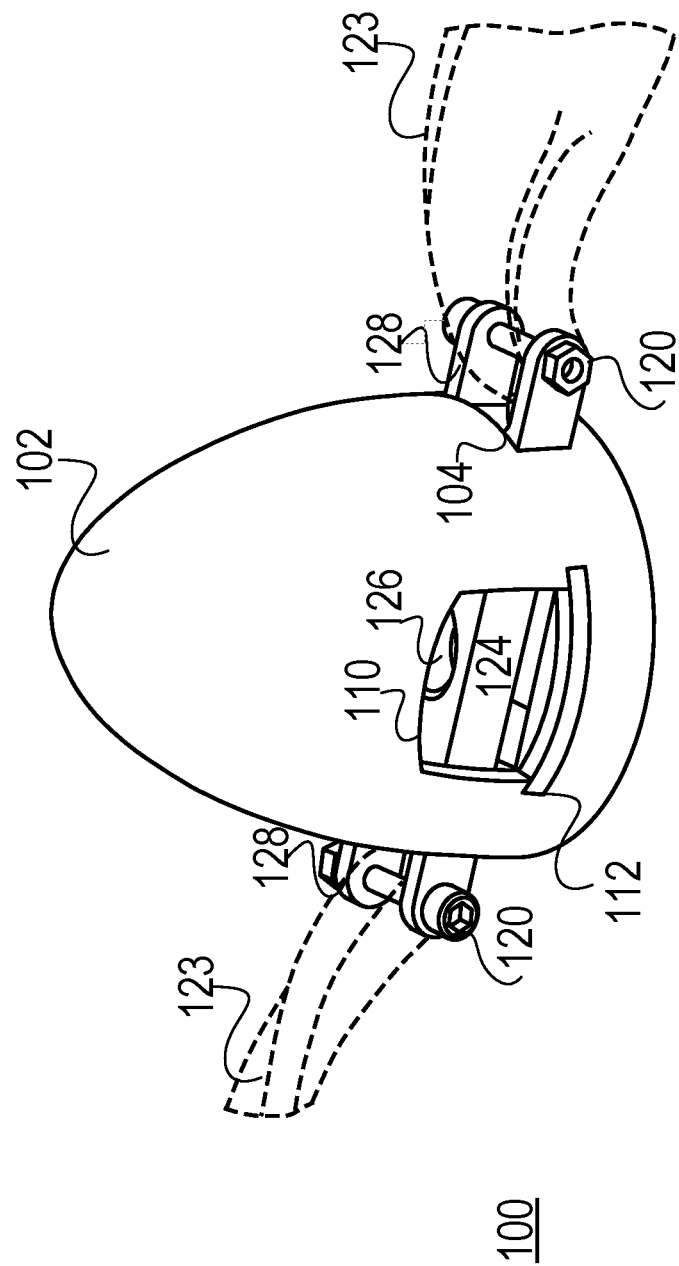
FIG. 1 is a perspective illustration of a nose cone and propeller assembly according to certain embodiments described here.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments.

Overview

Aircraft including model airplanes, drones, remotes and other aircraft, both large and small, sometimes crash into the ground or other object. Such crashes may incur damage to the airframe and require extensive fixes. Other times, the performance of an aircraft may be required to change due to the tasks it is required to perform. In either case, it may be beneficial to be able to quickly and easily change out parts of the airframe, with minimal loose connector parts, so as to minimize downtime for the aircraft. Such features may also minimize cost because users may only have to replace damaged sections or specific parts that need replacing instead of replacing the entire aircraft. Such modular component features may be useful for the nose cone, propeller assembly and the motor section of an aircraft. The disclosure here relates to quick-connect nose cone assemblies for aircraft, but may be useful for connecting other component parts such as a tail section, peripherals such as payload stores and drop tanks as well as accessories such as cameras, blivots, radars, etc. Any component or accessory part may be fitted with the connector assemblies discussed here to allow modular component changes.

Modular Examples

Fixed wing aircraft typically include a fuselage, wings, and tail section with a vertical and horizontal stabilizer or a combination elevator/rudder. Thrust for a fixed wing aircraft can be generated from various sources such as a propeller arrangement used in many applications today. The general components of a propeller system include a motor and at least two propeller blades. Some examples include a nose cone assembly that covers the fulcrum of the propeller blades and provides an aerodynamic frame feature. Rotor aircraft may use a similar covering over the rotor head of a propeller assembly.

As fixed wing aircraft fly in the air, they sometimes crash into the ground or other objects for various reasons such as a landing with a high rate of decent, loss of control, loss of fuel, or object strike. For whatever reason, an aircraft crash often places certain structural features of an aircraft at greater risk of impact and structural damage. Among the structural components at risk of impact and damage is a nose cone assembly in which propeller blades attach in a propeller driven aircraft. Such a nose cone is often at the leading portion of the fuselage and would be the first structural component to impact the ground or object in the event of a collision.

As nose cones may bear the brunt of an impact, it may be beneficial to support them for such impacts. It may also be beneficial to be able to replace only the damages structure to avoid having to change the entire airframe. Easily removed and replaced nose cones with and without a propeller assembly may therefore be beneficial for a user of an aircraft.

It should be noted that the term "fixed wing aircraft," and the references here to a nose cone and propeller are not intended to be limiting. Rotary aircraft such as helicopters, drone multi-copters, remotes and other aircraft may utilize similar embodiments for their rotary propellers and rotor heads.

FIG. 1 illustrates an example embodiment showing a nose cone assembly 100 with a nose cone 102 having an opening 110 and a snap ledge 112 which may be used to secure the nose cone 102 to a motor as described below. In some embodiments, the opening 110 and snap ledge 112 are included on both sides of the nose cone 102, opposite one another. The nose cone assembly 100 example in FIG. 1 also shows a propeller connector bar 124 fit into the nose cone 102 through two slots 104 (other side slot not visible). The example propeller connector bar 124 includes two flange pairs 128 on either side with each flange pair having a bolt/nut combination 120 running through them, thereby forming a hinge. The bolt/nut combination 120 and flange pairs 128 may be used to secure a propeller blade 123 onto the propeller connector bar 124 and nose cone 102 as described herein. The propeller connector bar 124 is also shown with a center hole 126 which may be used in mounting the nose cone assembly 100 to a motor as described herein.

As mentioned above, in some embodiments, the nose cone 102 can have more than one opening 110 and associated snap ledge 112. In a preferred embodiment, the nose cone 102 may include two openings, one on each side of the nose cone 102, each with their associated snap ledge 112. In some embodiments, the nose cone 102 may include three openings 110 positioned equidistant from one another around the nose cone 102. In some embodiments, four openings 110 may be positioned on the nose cone 102, each equidistant from one another and 90 degrees offset. The various nose cone assemblies and openings may allow for various configurations of snaps to snap the nose cone assembly 100 to a motor as described herein.

In some embodiments, the propeller connector bar 124 may secure more than just two propeller blades 123 and in such examples, may include flange pairs 128 that extend from other sides of the propeller connector bar 124 besides the two opposite one another as shown in FIG. 1.

In the example, the propeller blades 123 are shown hinged by the flange pairs 128 and bolt/nut 120 combinations to the propeller connector bar 124 and configured so that in use, when spinning, the blades 123 extend when they rotate to engage the air to propel the aircraft. In such example embodiments, when the blades 123 stop spinning, the bolt/nut 120 and flange pairs 128 form a hinge that allow the propeller blades 123 to fold back toward the fuselage for storage and to protect from damage.

In some embodiments, the nose cone 102 may be configured to provide a cushion in an impact with the ground or other object. In some embodiments, the nose cone 102 may include a crumple zone, designed to crush inward and absorb impact. Such a crumple zone may be made of a material that can absorb an impact and return to its original shape, such as foam, soft plastic or resin. In some embodiments the nose cone 102 may include a hard plastic shell but be filled with resilient impact absorbing material such as plastic foam. The nose cone 102 may have a replaceable tip section that screws on or snaps on in case of minor damage. A spring mechanism inside the nose cone assembly 100 may be used to disperse impact forces. Such as spring may allow for energy to be absorbed by the spring connecting the nose cone 102 to the motor (not pictured) or the motor to the airframe (not pictured).

Figure 2:
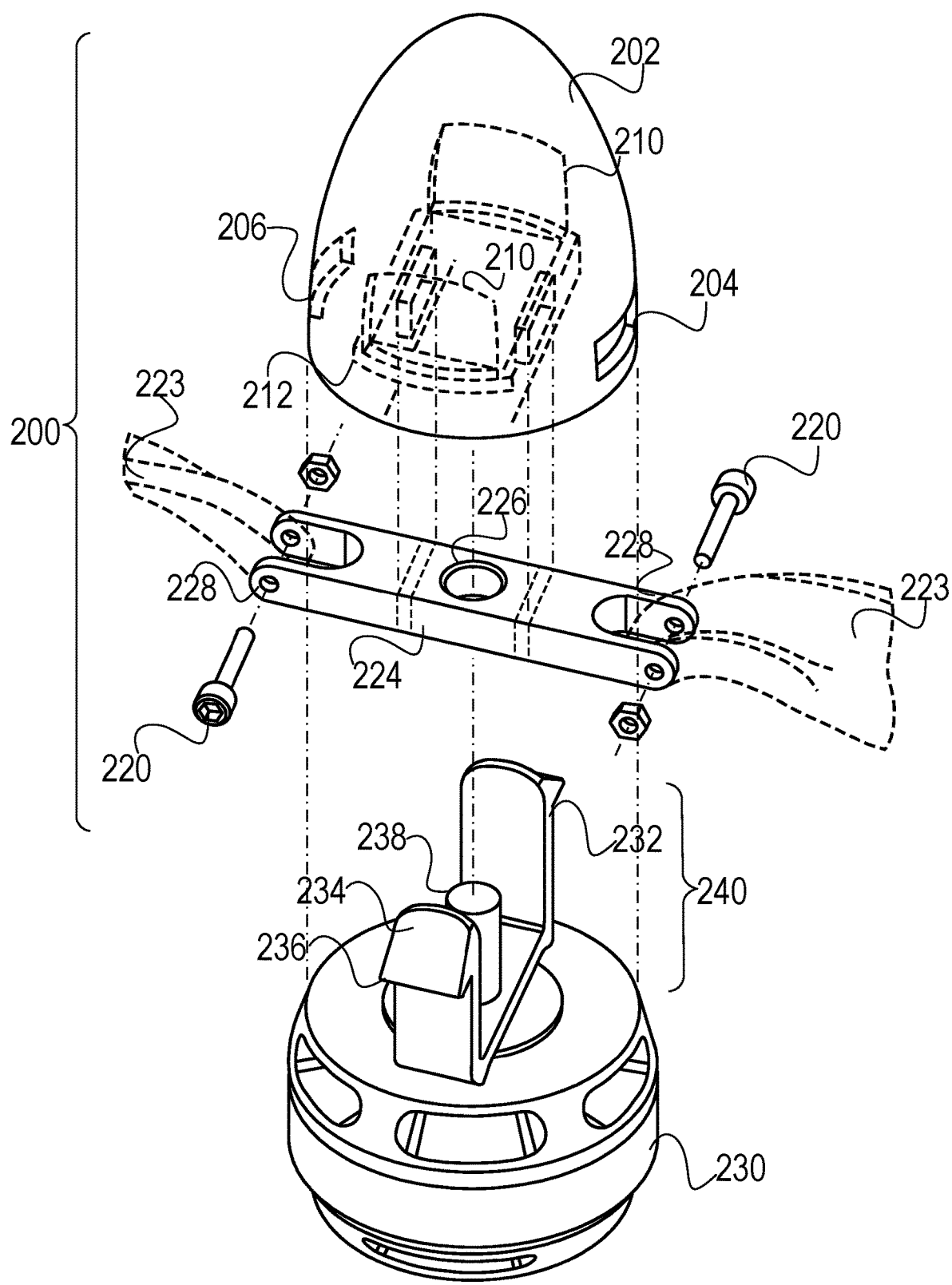
FIG. 2 is an exploded view illustration of a nose cone, propeller, and motor assembly according to certain embodiments described here.

FIG. 2 shows an example exploded view of an example nose cone assembly 200 and motor 230. In this view, the nose cone 202 is shown detached from the propeller connector bar 224 with the individual flange pairs 228 holding the bolt/nut assemblies 220. In some embodiments, the propeller connector bar 224 may slide into the nose cone 202 through slots 204, 206 on either side of the nose cone 202 as was shown in FIG. 1. When the bolt/nut assemblies 220 are fastened to the propeller connector bar 224 after it is slid into the slots 204, 206 in the nose cone 202, the propeller connector bar 224 and nose cone 202 become fixed together.

In the example of FIG. 2, the propeller connector bar 224 is shown with a center hole 226 which can be mated to a motor assembly 230 by way of a center post 238. The center post 238 is configured on a rotatable section 240 of the motor 230 and includes two torque arms 232, 234 in the example. The number of torque arms 232, 234 may match the number of nose cone openings 210 in the nose cone 202 as the torque arms 232, 234 may be used to attach or snap into the nose cone 202 and impart any torque energy generated by the motor 230 to the nose cone assembly 200 and attached propellers 223 as described herein. The two torque arms 232, 234 may each include a snap flange 236 which may mate with the snap ledges 212 of the nose cone openings 210 on the nose cone 202. In examples where the propeller connector bar 224 and nose cone 202 are assembled, they may be attached to the motor assembly 230 by sliding the center post 238 of the propeller spinner section 240 motor assembly 230 into the propeller connector bar 224 center hole 226 and the torque arms 232, 234 each with a snap flange 236 fit into the openings 210 of the nose cone 202. In so doing, the snap flanges 236 on the torque arms 232, 234 may snap fit into the openings 210 and the associated snap ledges 212 on the nose cone 202. This allows for the nose cone assembly 200 and propeller 223 to be snapped on and off the motor 230 by a user in case of a change for damage or storage or performance requirements.

In some embodiments, the torque arms 232, 234 are made of material that is able to be deflected if pushed by a user. Thus, the two torque arms 232, 234, of FIG. 2 could be pressed in toward the center post 238 but just enough to allow the nose cone assembly 200 to snap onto the torque arms 232, 234. The torque arms 232, 234 could be resilient and return to their original positions after a user deflected them slightly toward the center post 238 and thereby impart a snap force which could hold the nose cone assembly 200 to the motor assembly 230 when assembled.

In some embodiments, the snap ledge 212 may be replaced or augmented with some other kind of attachment device to hold the nose cone assembly 200 to the motor assembly 230. Other kinds of attachments could be a friction fit, threaded screw, twist snap, circumferential snap, hook and loop, magnetic or other type attachment. The description of the snap ledge 212 and associated snap flange 236 are not intended to be limiting.

Figure 3:
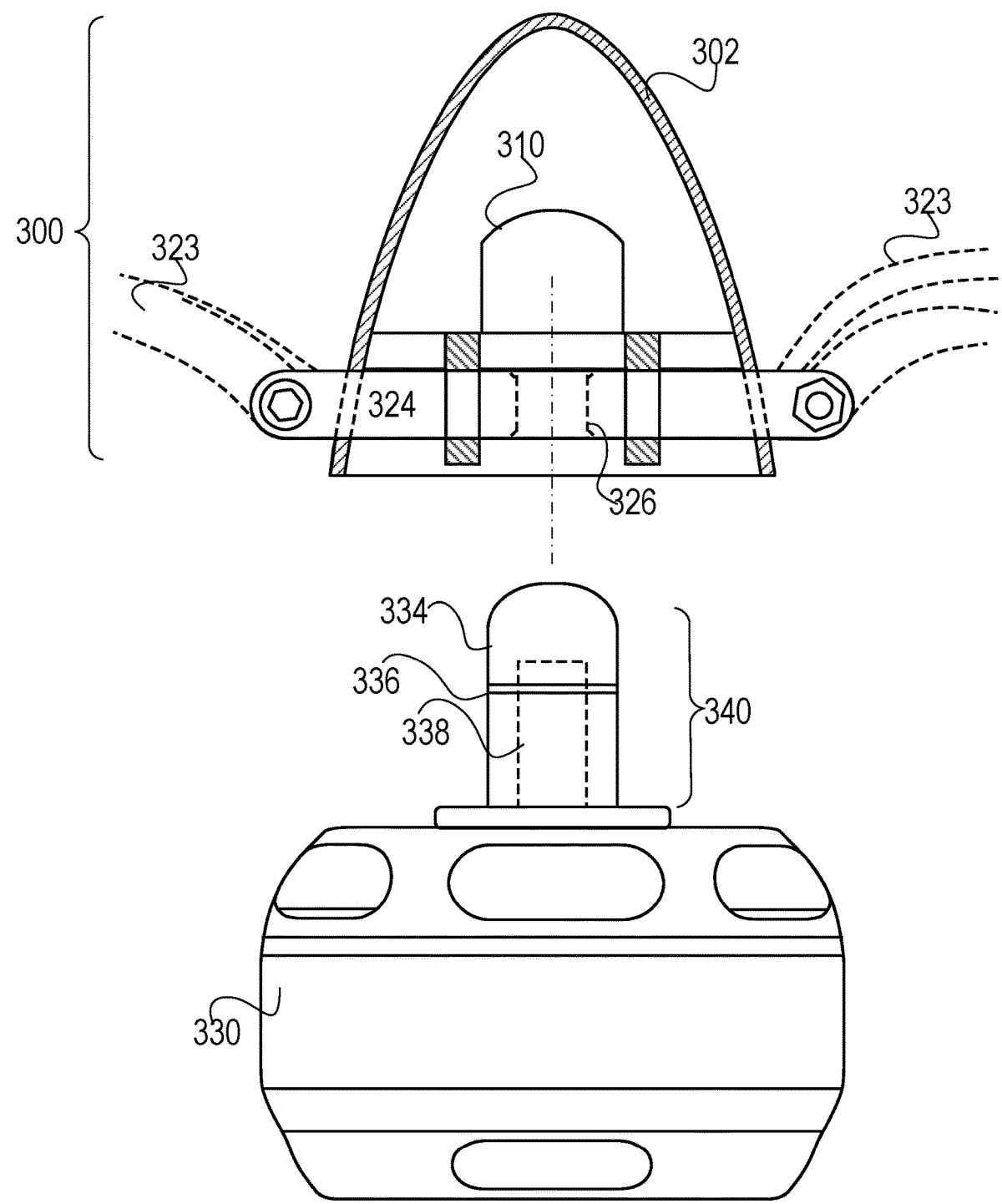
FIG. 3 is a side view illustration of a disassembled nose cone, propeller, and motor assembly according to certain embodiments described here.

FIG. 3 shows a side view of an example nose cone assembly 300 with the nose cone 302 assembled with the propeller connector bar 324 mounted in the nose cone 302. In the example, one of the nose cone 302 openings 310 is shown as well. The motor assembly 330 is shown with one torque arm 334 visible and a hidden center post 338 as well, forming the rotatable section 340 of the motor assembly 330. When fit together for operation, the nose cone 302 openings 310 each snap fit into the torque arm 334 snap flange 336 and the center post 338 fits into the center hole 326 of the propeller connector bar 324, thereby securing the propellers 323 and nose cone assembly 300 to the rotatable section 340 of the motor assembly 330. In operation in these examples, when the motor 330 spins the torque arms 334, the entire nose cone assembly 300 and propeller 323 spins as well.

Figure 4:
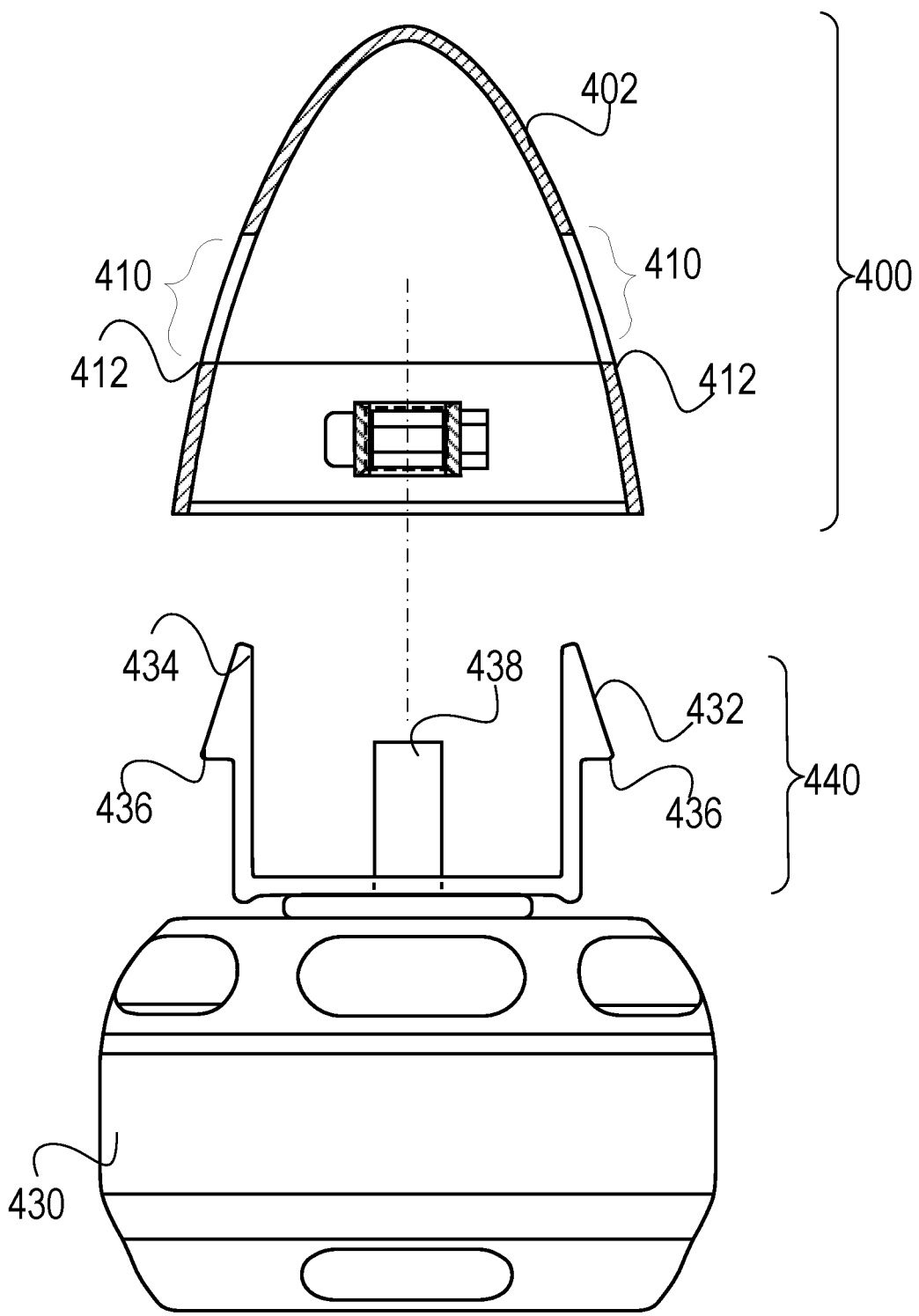
FIG. 4 is another side view illustration of a nose cone, and motor assembly according to certain embodiments described here.

FIG. 4 shows another partially-exploded side view of the nose cone assembly 400 and motor 430 but 90 degrees from that shown in FIG. 3. In the example of FIG. 4, the nose cone 402 and the openings 410 are shown as well as the motor 230 and the rotatable section 440. In this view, the rotatable section 440 shows both torque arms 432, 434 and the center post 438. The snap flange 436 is visible in this view of the torque arms 434, 436 and it can be seen how they may slide into and snap fit into the openings 410 of the nose cone 402, thereby securing the nose cone assembly 400 to the motor assembly 430 by the rotatable section 440 torque arms 432, 434.

Figure 5:
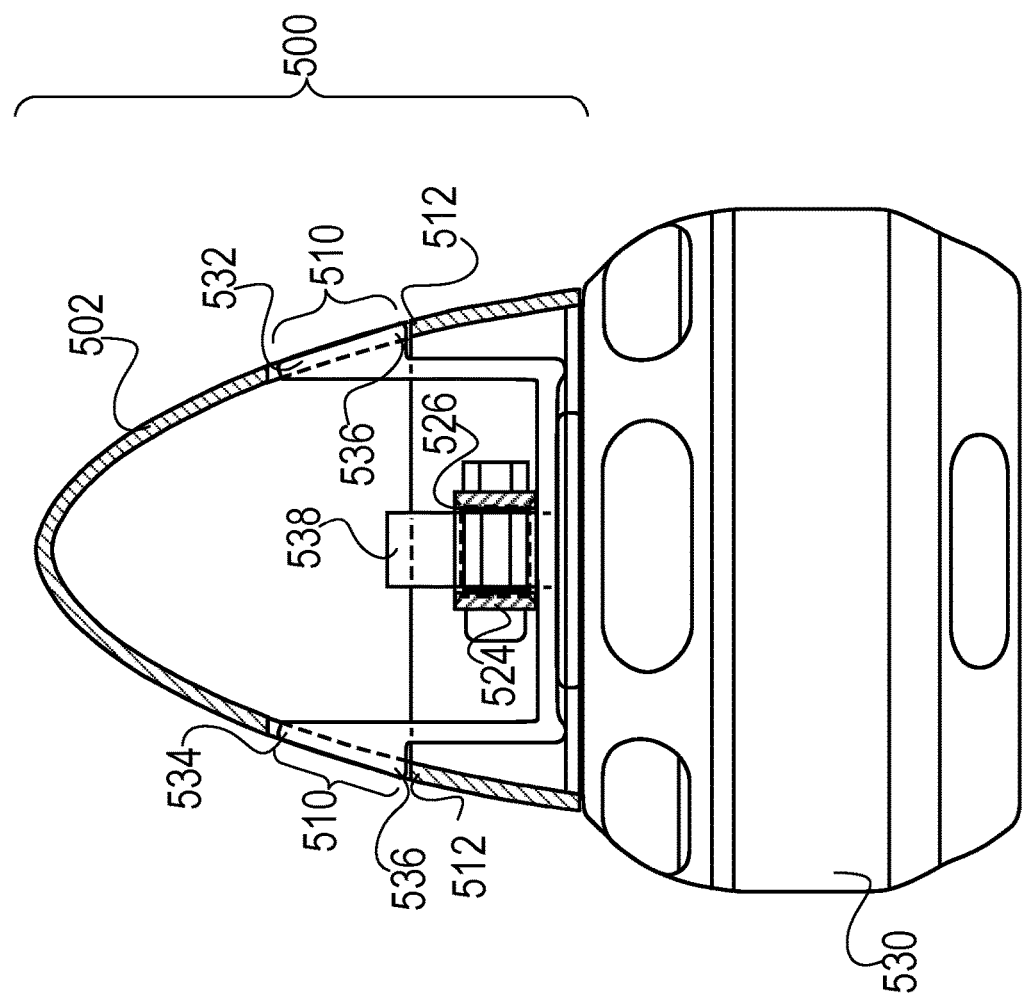
FIG. 5 is a side view illustration of an assembled nose cone and motor assembly according to certain embodiments described here.

The embodiment of FIG. 4 shows the torque arms 432, 434 in their resting position. If a user were to push the nose cone assembly 400 down, onto the motor assembly 430 and rotatable section 440, the torque arms 432, 434 may deflect inward, toward the center post 438 and thereby allow the nose cone 402 to slide down far enough for the nose cone openings 410 to allow the snap flanges 436 to clear the snap ledges 412 of the nose cone openings 410 and thereby allow the torque arms 432, 434 to return to their resting position (as shown in FIG. 5). The resilient torque arms 432, 434 may then impart a force outward from the center post 438 to hold the snap flanges 436 over the snap ledges 412. In this way, the nose cone assembly 400 may snap onto the torque arms 432, 434 and secure the motor assembly 430 for operation.

FIG. 5 shows an example side view of an assembled nose cone assembly 500 and motor 530 from the same angle as that shown in FIG. 4 but in this figure, assembled. The example of FIG. 5 shows the nose cone 502 fitted to the torque arms 532, 534 by the nose cone openings 510 and secured by the snap flanges 536 and the corresponding snap ledges 512. The center post 538 is shown fitted inside the center hole 526 of the propeller connector bar 524.

The embodiment of FIG. 5 also shows the torque arms 532, 534 in their resting position holding the nose cone assembly 500 in place. In the example embodiment, a user could impart a force by pushing on the torque arms 532, 534 toward the center post 538 far enough to deflect the torque arms 532, 534 and their associated snap flanges 536 past the snap ledges 512 of the nose cone openings 510 in order to disassemble the nose cone assembly 500 and remove it from the motor assembly 530.

In operation, the motor 530 spins the torque arms 532, 534 and the center post 538 and thereby spins the nose cone assembly 500.

CONCLUSION

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the embodiments have been specifically described herein, it will be apparent to those skilled in the art to which the embodiments pertains that variations and modifications of the various implementations shown and described herein may be made without departing from the spirit and scope of the embodiments. Accordingly, it is intended that the embodiments be limited only to the extent required by the applicable rules of law.

What is claimed is:

1. An assembly, comprising:
   a nose cone unitary in construction;
   a motor assembly with a rotatable section configured for rotation about an axis of rotation,
      the rotatable section including torque arms configured for insertion into openings formed in a sidewall of the nose cone such that the openings extend transversely in relation to the axis of rotation; and
   a propeller assembly configured for connection to the motor assembly, the propeller assembly including:
      a propeller connector bar supported between the torque arms and extending through the nose cone such that rotation of the rotatable section causes corresponding rotation of the propeller connector bar; and
      propellers directly connected to ends of the propeller connector bar such that rotation of the propeller connector bar causes corresponding rotation of the propellers.

2. The assembly of claim 1, wherein the motor assembly is detachably coupled to an airframe.

3. The assembly of claim 1, wherein the openings in the nose cone each include a snap ledge.

4. The assembly of claim 3, wherein the torque arms each include a snap flange configured to mate with one of the snap ledges.

5. The assembly of claim 1, wherein the ends of the propeller connector bar are configured for pivotable connection to the propellers.

6. The assembly of claim 4, wherein the torque arms are deflectably resilient toward each other to allow the nose cone to snap on and off the torque arms of the motor assembly.

7. The assembly of claim 1, wherein the propeller connector bar extends through slots in the nose cone.

8. The assembly of claim 7, wherein the nose cone includes two openings and two slots.

9. The assembly of claim 7, wherein the propeller connector bar includes a center hole and the motor assembly includes a center post, the center hole being configured to receive the center post.

10. An assembly, comprising:
   a nose cone with a first pair of openings defining a first axis extending in a first direction and a second pair of openings defining a second axis extending in a second direction transverse in relation to the first direction;
   a motor assembly rotatable about an axis of rotation, the motor assembly including at least two rotatable torque arms each with a tab configured for receipt within the first pair of openings in the nose cone to thereby connect the motor assembly to the nose cone; and
   a propeller assembly rotatably supported by the motor assembly, wherein the propeller assembly extends through the second pair of openings in the nose cone such that the propeller assembly extends transverse relation to the axis of rotation.

11. The assembly of claim 10, wherein the second pair of openings in the nose cone are configured as slots such that the propeller assembly is slidably insertable through the nose cone.

12. The assembly of claim 11, wherein the propeller assembly further includes at least two propeller blades hingedly supported adjacent to opposing ends thereof.

13. The assembly of claim 10, wherein the motor assembly further comprises a center post configured to fit in a center hole of the propeller assembly.

14. The assembly of claim 10, wherein the nose cone is filled with plastic foam.

15. The assembly of claim 10, wherein the at least two rotatable torque arms of the motor assembly each include a snap flange and are deflectable.

16. The assembly of claim 15, wherein each snap flange is configured for receipt within the first pair of openings in the nose cone.

17. The assembly of claim 10, wherein the motor assembly is detachably coupled to an airframe.

18. An airplane nose assembly, comprising:
   a nose cone unitary in construction and including radial openings extending into a sidewall of the nose cone;
   a motor assembly including connection arms configured for engagement with the radial openings to thereby connect the motor assembly to the nose cone; and
   a propeller assembly extending through the nose cone.

19. The airplane nose assembly of claim 18, wherein the nose cone includes at least two radial openings.

20. The airplane nose assembly of claim 18, wherein the connection arms on the motor assembly are deflectably resilient.

* * * * *